United States Patent [19]

Overbeek et al.

[11] Patent Number: 5,859,112
[45] Date of Patent: Jan. 12, 1999

[54] PRODUCTION OF AQUEOUS POLYMER COMPOSITIONS

[75] Inventors: Gerardus Cornelis Overbeek, Waalwijk, Netherlands; Yvonne Wilhelmina Smak, Niewegein, Netherlands; Alfred Jean Paul Buckmann, Hertogenbosch, Netherlands; John Christopher Padget, Cheshire, United Kingdom

[73] Assignees: Zeneca Resins B.V., Waalwijk, Netherlands; Zeneca Limited, London, United Kingdom

[21] Appl. No.: 737,043

[22] PCT Filed: Apr. 27, 1995

[86] PCT No.: PCT/GB95/00948

§ 371 Date: Nov. 1, 1996

§ 102(e) Date: Nov. 1, 1996

[87] PCT Pub. No.: WO95/29944

PCT Pub. Date: Nov. 9, 1995

[30] Foreign Application Priority Data

May 3, 1994 [GB] United Kingdom .................. 9408748

[51] Int. Cl.$^6$ ...................................................... C08F 2/22
[52] U.S. Cl. .................... 524/460; 523/201; 523/404; 523/408; 523/412; 524/502; 524/507; 524/512; 524/458
[58] Field of Search .................... 524/460, 458, 524/502, 507, 512; 523/201, 404, 408, 410; 428/423.1, 421, 424.4, 424.6, 424.7, 424.8, 425.1, 425.8, 500, 502, 503, 511, 514, 520, 521

[56] References Cited

FOREIGN PATENT DOCUMENTS

| 555774 | 8/1993 | European Pat. Off. . |
| WO94/09045 | 4/1994 | WIPO . |

*Primary Examiner*—Judy M. Reddick
*Attorney, Agent, or Firm*—Pillsbury Madison & Sutro LLP

[57] ABSTRACT

Process for making organic solvent-free aqueous crosslinkable polymer composition comprising: a) preparing an aqueous solution of an acid-functional olgiomer with Tg below 50° C. and having crosslinker functional groups; b) conducting an aqueous emulsion polymerisation to make an aqueous emulsion of an olefinic hydrophobic polymer in the presence of the aqueous oligomer solution, the hydrophobic polymer having Tg at least 25° C. higher than that of the oligomer and optionally crosslinker functional groups, and c) combining with a crosslinking agent reactable with the crosslinker groups of the oligomer and polymer, said composition having Koenig hardness of ≧40 sec and minimum film forming temperature (MFFT)≦55° C. Also the aqueous composition so formed and its use in various applications. The aqueous composition has excellent properties and in particular an advantageous balance of MFFT and Koenig hardness.

50 Claims, No Drawings

PRODUCTION OF AQUEOUS POLYMER COMPOSITIONS

This application is the national phase application PCT/GB95/00948, filed Apr. 27, 1995 which designated the U.S.

The present invention relates to a process for the production of certain aqueous crosslinkable polymer compositions useful for coating, to the aqueous compositions so produced, and to their use in coating applications.

There is an ever increasing impetus to replace or supplement solvent-based polymer coating compositions with aqueous-based counterparts due to the environmental toxicity and flammability problems posed by the use of volatile organic solvents. However, even where aqueous-based polymer compositions have been devised, their production has usually entailed the intermediate use of organic solvents, requiring subsequent removal which is costly and time-consuming, or the incorporation of a certain amount of a solvent in the final composition which acts to ensure proper film-formation on coating (known as a coalescing solvent). There is therefore also now increasing pressure to significantly reduce or eliminate the volatile organic contents (VOC's) in aqueous-based polymer composition syntheses both as components in their production (even if subsequently removed) and in the resulting composition as an aid to film coalescence.

Further still, even if one can achieve a solvent-free aqueous polymer coating composition, it has been found difficult to achieve one with a balance of good properties conventionally required in most coating compositions, particularly acceptably high hardness and low minimum film forming temperature (MFFT). It should also have good water and solvent resistance, and good storage stability.

We have now invented a process which enables such compositions to be prepared. In particular, the process of the invention produces in most if not all cases in the resulting composition an exceptionally advantageous combination of MFFT and hardness wherein one obtains in a given composition an exceptionally high hardness opposite the particular MFFT of that composition.

According to the present invention there is provided a process for the production of an organic solvent-free aqueous crosslinkable polymer composition useful for coating, which process is organic solvent-free and comprises:

a) preparing an aqueous solution of an acid-functional oligomer built from olefinically unsaturated monomers, said oligomer having a number average molecular weight Mn within the range of from 500 to 50,000 (preferably 2000 to 25000), a glass transition temperature Tg below 50° C. (preferably below 20° C.), said oligomer being formed using an organic solvent-free aqueous emulsion or aqueous solution polymerisation process, and said acid functionality rendering the oligomer water-soluble per se or by neutralization, and said oligomer also having functional groups for imparting crosslinkability when the aqueous polymer composition is subsequently dried, b) conducting an aqueous emulsion polymerization process to form an aqueous emulsion of a hydrophobic polymer from at least one olefinically unsaturated monomer in the presence of the aqueous solution of the oligomer, said hydrophobic polymer having a Tg which is at least 25° C. higher than the Tg of said oligomer (preferably at least 40° C. higher), and said hydrophobic polymer optionally having functional groups for imparting crosslinkability when the aqueous polymer composition is subsequently dried, and c) combining the aqueous emulsion from b) with a crosslinking agent by addition of the crosslinking agent after the polymerisation of step b) and/or performing the polymerisation in the presence of the crosslinking agent, said crosslinking agent being reactable with the crosslinker functional groups of the oligomer and (if present) of the hydrophobic polymer on subsequent drying to effect crosslinking, wherein said crosslinking agent is not an agent which effects crosslinking by the formation of ionic bonds, and wherein further, said polymer composition on drying has a Koenig hardness of at least 40 sec (preferably within the range 60 to 200 sec) and said polymer composition has a minimum film forming temperature of $\leq 550°$ C. (preferably within the range 0° to 30° C.).

There is also provided an aqueous polymer composition which is formable by a process as defined supra.

There is further provided the use of an aqueous polymer composition as defined supra in coating applications, and in particular in the protective coating of substrates such as wood, plastics, metal and paper.

The prior art discloses a number of processes in which an aqueous emulsion of a polymer system containing a low molecular weight hydrophilic polymer and a hydrophobic emulsion polymer has been produced by a multistage process and in which (often) the hydrophilic oligomer has been solubilized in the aqueous medium.

U.S. Pat. No. 4,151,143 claims the production of surfactant-free emulsion polymer coating compositions using a process which involves (1) a first stage wherein organic solution-prepared carboxyl-functional polymer is dispersed/solubilized in water by neutralisation and (2) a second stage wherein a mixture of polymerisable monomers is subjected to emulsion polymerisation. The first stage polymer can be of relatively low molecular weight, the first and/or second stage polymer is optionally hydroxy-functional and the emulsion can be optionally mixed with an amino-type crosslinker such as hexamethoxymethyl melamine.

U.S. Pat. No. 4,894,394 concerns the production of an inverted core/shell latex by (1) preparing a hydrophilic low molecular weight first stage polymer by aqueous emulsion polymerisation; (2) conducting a second emulsion polymerisation to produce a hydrophobic second stage; and (3) adjusting the pH of the resulting inverted core-shell emulsion to dissolve the first stage. The first and second stage monomers can optionally include hydroxyalkyl (meth)acrylates and glycidyl (meth)acrylate although no emphasis is laid on them.

U.S. Pat. No. 4,845,149 relates to an emulsion polymer preparation (useful as a pressure sensitive adhesive) by emulsion polymerising monomers in the presence of an aqueous solution or dispersion of a carboxyl functional support polymer (of low molecular weight).

U.S. Pat. No. 4,904,724 (=EP 320865) discloses that an organic solvent solution polymer system (a blend of acid-functional and acid-free polymers) is dispersed into water with neutralisation and used as the seed for an aqueous emulsion polymerisation. The solution polymers can be carbonyl functional in which case a crosslinker such as polyhydrazide is added.

CA 2,066,988 (=DE 4,113,839) relates to emulsifier-free emulsion polymerisation by polymerisation of ethylenic monomers (A) in an aqueous medium containing a neutralised acid-containing polymer (B) (preferably water-soluble styrene/acrylic acid copolymer of molecular weight 1,000–5,000). The (A) monomers are fed to the aqueous medium during polymerisation and can optionally include amino or glycidyl functional monomers, although crosslinking per se is not mentioned.

EP 0,522,791 is concerned with redispersible polymer powders prepared by a 2-stage aqueous emulsion sequential polymerisation process to make a core/shell polymer emulsion, followed by optional spray drying. In the first stage a low molecular weight carboxy-functional polymer which can optionally include up to 30% hydroxyalkyl (meth)acrylate is polymerised in aqueous emulsion to form the shell part; this is neutralised, and in the second stage, monomers, which can again optionally include up to 30% hydroxyalkyl ester, are polymerised to form the core part, and the aqueous emulsion of core/shell polymer optionally converted by spray drying into a redispersible polymer powder. The core and shell are preferably grafted together in the emulsion by the use of polyfunctional compounds such as allyl methacrylate. The disclosure is silent as to the use of a crosslinking agent to effect curing after any coating formation.

EP 0,587,333 is directed to water-resistant multi-stage polymer aqueous emulsions having an alkali-insoluble polymer and dissolved alkali-soluble, acid-functional oligomer. They are made by sequential aqueous emulsion polymerisation of a monomer system for the oligomer, including an acid functional monomer and optionally a polyfunctional compound, followed by that of a monomer system for the alkali-insoluble polymer optionally including an amine-functional monomer. The purpose of the polyfunctional compound, or the amine functionality of the alkali-insoluble polymer is to cause physical or chemical interaction between the alkali-soluble oligomer and alkali-insoluble polymer while present in the emulsion, e.g. by grafting together of the two phases while forming the final emulsion. Additionally, the aqueous emulsion can incorporate metal ions such as those of Zn, Mg, and Ca so as to create ionic metal/carboxylate crosslinks, which would occur after coating formation from the emulsion. The alkali-soluble oligomer is solubilized in the emulsion either by neutralizing it with a base after completing both polymerisation stages or, less preferably by neutralizing it with a base before the commencement of the second stage polymerisation to form the alkali-insoluble polymer.

None of the above-discussed disclosures teaches a process having the selected combination of features and integers as defined in the invention process which are utilised to produce a composition suitable for coating having such an advantageous combination of properties as discussed above.

The process of the invention results in an aqueous composition providing a polymeric coating of high hardness (as defined) on substrates such as wood, plastics, metal and paper, the aqueous composition being of low MFFT (as defined). It also achieves coatings of good solvent and water resistance. The process itself is organic solvent-free, as is the resulting aqueous polymer composition. The composition also has good shelf stability.

In particular, the process of the present invention allows the production of compositions which at least for the most part have an exceptionally advantageous balance of MFFT and Koenig hardness wherein one obtains an unusually high Koenig hardness for the particular value of MFFT of the composition. This is most surprising because the achievement of low MFFT and high hardness in a composition would normally work against each other, i.e. if the composition has a very low MFFT it will tend not to have a particularly high hardness, or a very high hardness for the composition will not be commensurate with a relatively low MFFT.

Being aqueous-based, the lower limit of MFFT for invention compositions will of course be the freezing point of the aqueous carrier phase. This will usually be about 0° C. (perhaps slightly lower because of any dissolved constituent (s) although not usually below −20° C.). Therefore the range of MFFT for the invention compositions will usually be about 0° to 55° C., more usually 0° to 30° C. The Koenig hardness will be $\geq$ 40 sec and more usually in the range 60 to 200 sec.

As discussed above, a particularly advantageous feature is that for most (if not all) compositions of the invention the combination of MFFT and Koenig hardness is surprisingly exceptionally advantageous. We have in fact found that most (if not all) compositions of the invention (certainly those we have made thus far), fit the following empirical equation in terms of the relationship of MFFT and Koenig hardness, where H represents Koenig hardness (in secs) and T represents MFFT (in °C.):

$$H \geq 1.5T + 70$$

So, e.g. when T=0° C., H is $\geq$70 secs; when T is 5° C., H is $\geq$77.5 secs; when T is 10° C., H is $\geq$85° C. sec; when T is 20° C., H is $\geq$100° C., when T is 40° C., H is $\geq$130° C. and so on.

Moreover, in all the invention compositions we have made thus far, the combination of MFFT and Koenig hardness is even more advantageous than suggested above and fits the empirical relationship:

$$H \geq 1.5T + 90$$

So, e.g. when T is 0° C., H is $\geq$90 secs; when T is 10° C., H is $\geq$105 secs; when T is 40° C., H is $\geq$150 secs and so on.

The solubilization of the oligomer is effected before carrying out the polymerisation of step b). Solubilization subsequent to the polymerisation to form the hydrophobic polymer, the preferred technique in the process of EP 0,587,333, would incur a worse MFFT/Koenig hardness balance as compared to solubilization prior to making the hydrophobic polymer.

Effecting grafting (or pre-crosslinking) during the formation of the emulsion composition, as described in EP 0,587,333 would likewise result in an inferior balance of MFFT and Koenig hardness as compared to effecting covalent crosslinking after coating formation, as is achieved with the compositions of the invention.

Furthermore, providing ionic crosslinking after coating formation, also as described in EP 0.587,333, would detract from the advantageous balance of MFFT and Koenig hardness as achieved by the process of the present invention.

The process of the invention, including the stage of making the oligomer, is organic solvent-free, as is the resulting polymer composition. While solvent-free usually means entirely solvent-free, it will be appreciated that from a practical viewpoint it may sometimes be difficult to exclude very small amounts of organic solvent(s), which would otherwise have no material effect on the process or composition, as e.g. when incorating a small amount of a commercially-obtained additive which might be carried in a vehicle which is at least partly an organic solvent(s). Therefore organic solvent-free is intended to also extend to substantially organic solvent-free.

In step a) of the process there is formed an aqueous solution of an oligomer of Mn 500 to 50,000 and built from the polymerisation of olefinically unsaturated monomers. The polymerisation technique employed, which is organic solvent-free, may in principle be an aqueous solution polymerisation process to produce directly an aqueous solution of the oligomer, but is more usually a conventional aqueous emulsion polymerisation process to form an aqueous polymer emulsion or latex. Such a process is extremely well known and need not be described in great detail. Suffice to say that such a process involves dispersing the monomer(s) in an aqueous medium and conducting polymerisation using a free-radical initiator (normally water soluble) and (usually) appropriate heating (e.g. 30° to 120° C.) and agitation (stirring) being employed. The aqueous emulsion polymerisation can be effected with conventional emulsifying agents (surfactants) being used [e.g. anionic and/or non-ionic emulsifiers such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates such as Na lauryl sulphate, alkali metal salts of sulphonic acids. $C_{12-24}$ fatty alcohols, ethoxylated fatty acids and/or fatty amides, and Na, K and $NH_4$ salts of fatty acids such as Na stearate and Na oleate; aryl-containing analogues of the alkyl-containing surfactants are also useful; other surfactants include phosphates. The amount used is preferably low, preferably 0.3 to 2% by weight, more usually 0.3 to 1% by weight based on the weight of total monomer(s) charged. The polymerisation can employ conventional free radical initiators [e.g. hydrogen peroxide, t-butyl-hydroperoxide, cumene hydroperoxide, persulphates such as $NH_4$ persulphate, K persulphate and Na persulphate; redox systems may be used; combinations such as t-butyl hydroperoxide, isoascorbic acid and Fe EDTA are useful; the amount of initiator, or initiator system, is generally 0.05 to 3% based on the weight of total monomers charged]. [It will be appreciated that it is not necessary to employ the entire amount of the oligomer prepared from polymerisation, or an aqueous solution of this entire amount, for the aqueous oligomer solution which is specified in steps a) and b) of the invention process (although it can be if desired); only a portion of it need be used for the purposes of steps a) and b)].

The emulsion polymerisation process when used for step a) may be carried out using an "all-in-one" batch process (i.e. a process in which all the components to be employed are present in the polymerisation medium at the start of polymerisation) or a semi-batch process in which one or more of the components employed (usually at least one of the monomers) is wholly or partially fed to the polymerisation medium during the polymerisation. Although not preferred, fully continuous processes could also be used in principle.

The polymerisation technique employed must of course be such that a low molecular polymer (as defined) is formed, e.g. by employing a chain transfer agent such as one selected from mercaptans (thiols), certain halohydrocarbons and a-methyl styrene, as is quite conventional.

By an aqueous solution of the acid-functional oligomer may be meant herein that the oligomer is completely or substantially completely dissolved in the aqueous medium so that it is present as a true solution. However the term also extends to the oligomer existing as a dispersion in the aqueous medium (the term "water-soluble" being similarly construed). In such a case the polymer dispersion is in particular a colloidal dispersion of the polymer particles (as in a polymer latex or emulsion). Sometimes, of course, the distinction between colloidal dispersions and true solutions is difficult to distinguish, a situation intermediate these states existing; or some of the polymer could be dispersed in the aqueous medium and some could be dissolved. Thus the term "aqueous solution" is also intended to embrace a disposition of the oligomer in an aqueous medium which corresponds to such intermediate states.

Preferably the acid-functional oligomer contains a sufficient concentration of acid functionality to render the polymer partially or more preferably fully soluble in aqueous media, if necessary by neutralisation of acid groups of the polymer, as would e.g. be achieved by adjustment of the pH of the aqueous medium. (If the acid-functional oligomer had only sufficient acid functionality to render it partially soluble in the aqueous medium of the emulsion, it could exist as a colloidal dispersion or intermediate between a colloidal dispersion and a true solution or could be partly dispersed and partly dissolved). Usually, the medium in which the oligomer finds itself will be acidic (pH<7) and the acid groups will be carboxyl groups so that dissolution will be effected by raising the pH of the medium (usually the aqueous polymerisation medium in which the oligomer has been prepared) so as to neutralize the acid groups by the addition of a base, such as an organic or inorganic base, examples of which include organic amines such as trialkylamines (e.g. triethylamine, tributylamine), morpholine and alkanolamines, and inorganic bases such as ammonia, NaOH, KOH, and LiOH. Of course, the aqueous medium containing the acid functional oligomer may already be alkaline (or sufficiently alkaline) such that the acid groups (such as carboxyl groups) become neutralized without the requirement for positively adding a base to raise pH, or the acid groups may be or include very strong acid groups such as sulphonic acid groups (pK 1 to 2) so that neutralisation may not be necessary to achieve dissolution. Further still, it is possible for acid monomers to be polymerised in salt form rather than as the free acid.

The aqueous emulsion polymerisation of step b) yields a hydrophobic emulsion polymer, this type of polymer being well understood by those skilled in the art. Generally speaking it may be considered herein as a water-insoluble polymer whose water-insolubility is maintained throughout the pH range. The hydrophobic nature of the polymer is achieved by virtue of the polymer containing a sufficient concentration of at least one hydrophobic monomer (i.e. in polymerised form) to render the polymer hydrophobic and water-insoluble throughout the pH range. Thus the emulsion polymer formed in the emulsion polymerisation process of step b) is insoluble in the aqueous medium of that polymerisation process regardless of any adjustments in pH to which the medium could be subjected.

The monomer system used for the preparation of the acid functional oligomer is any suitable combination of olefinically unsaturated monomers which is amenable to copolymerisation provided such a monomer system includes an acid-bearing comonomer(s) (preferably in sufficient concentration to render the resulting polymer fully or partially soluble in aqueous media as discusses supra), or a comonomer(s) bearing an acid-forming group which yields, or is subsequently convertible to, such an acid group (such as an anhydride, e.g. methacrylic anhydride or maleic anhydride, or an acid chloride) and also a comonomer(s) which imparts crosslinkability. Typically the acid-bearing comonomers are carboxyl-functional acrylic monomers or other ethylenically unsaturated carboxyl bearing monomers such as acrylic acid, methacrylic acid, itaconic acid and fumaric acid. Sulphonic acid-bearing monomers could also e.g. be used, such as styrene p-sulphonic acid (or correspondingly styrene p-sulphonyl chloride). An acid bearing monomer could be polymerised as the free acid or as a salt, e.g. the $NH_4$ or alkali metal salts of ethylmethacrylate-2-sulphonic acid or 2-acrylamido-2-methylpropane sulphonic acid, or the corresponding free acids. Other, non-acid functional non-crosslinking monomer(s) which may be copolymerized with the acid monomer(s) include acrylate and methacrylate esters and styrenes; also dienes such as 1,3-butadiene and isoprene, vinyl esters such as vinyl acetate, and vinyl alkanoates. Methacrylates include normal or branched alkyl esters of C1 to C12 alcohols and methacrylic acid, such as methyl methacrylate, ethyl methacrylate, and n-butyl methacrylate, and (usually C5 to C12) cycloalkyl methacrylates acid such as isobornyl methacrylate and cyclohexyl methacrylate. Acrylates include normal and branched alkyl esters of C1 to C12 alcohols and acrylic acid, such as methyl acrylate, ethyl acrylate, n-butyl acrylate, and 2-ethylhexyl acrylate, and (usually C5 to C12) cycloalkyl acrylates such as isobornyl acrylate and cyclohexylacrylate. Styrenes include styrene itself and the various substituted styrenes, such as α-methyl styrene and t-butyl styrene. Nitriles such as acrylonitrile and methacrylonitrile may also be polymerised, as well as olefinically unsaturated halides such as vinyl chloride, vinylidene chloride and vinyl fluoride. Functional monomers which impart crosslinkability (crosslinking monomers for short) include epoxy (usually glycidyl) and hydroxyalkyl (usually C1 to C12 e.g. hydroxyethyl) methacrylates and acrylates, as well as keto and aldehyde functional monomers such as acrolein, methacrolein, and vinyl methyl ketone, the acetoacetoxy esters of hydroxyalkyl (usually C1 to C12) acrylates and methacrylates such as acetoacetoxyethyl methacrylate and acrylate, and also keto-containing amides such as diacetone acrylamide. The purpose of using such functional monomer is to provide subsequent crosslinkability in the resulting polymer system as discussed. (In principle the functional monomer used for imparting crosslinkability could be acid-bearing monomer, but this is not usual).

Typically, the acid functional oligomer is derived from a monomer system which contains 1–45 weight % of acid comonomer(s), preferably 3–30 weight % and more preferably 3–20 weight %; 0.5 to 20 weight %, preferably 1 to 15 weight %; and particularly 1 to 10 weight % of crosslinking monomer(s); and 98.5–50 weight % of non acid functional, non-crosslinking comonomer(s), preferably 96–65 weight %, and more preferably 96–75 weight %. The non acid functional, non-crosslinking comonomer(s) in some cases is usefully selected from one or more of methyl methacrylate, styrene, ethyl acrylate, n-butyl methacrylate, 2-ethyl hexyl acrylate and n-butyl acrylate while the acid monomer is for example methacrylic acid and/or acrylic acid. Useful oligomers of this type are derived from a monomer system which contains 3–12 weight % methacrylic acid and/or acrylic acid, 1 to 10 weight % of diacetone acrylamide and/or acetoacetoxy ethyl methacrylate, 10–30 weight % methyl methacrylate, 30–70 weight % of n-butyl acrylate, 0–40 weight % of one or more of ethyl acrylate, 2-ethylhexyl acrylate and n-butyl methacrylate and 0–40 weight % styrene.

The oligomer from step a) should have a number average molecular weight within the range of from 500–50,000, preferably 2000–25,000 and particularly 3,000–19,000. (Polymer molecular weights may be determined by gel permeation chromatography calibrated using an appropriate known polymer as standard). The Tg of the oligomer is below 50° C., preferably below 20° C. Tg will not normally be below −75° C. (and usually not below −50° C.). A preferred range for Tg is −75° C. to <50° C., more preferred −50° C. to <20° C.

The aqueous emulsion polymerisation process employed in step b) to form the hydrophobic polymer, may, apart from the incorporation of the acid functional oligomer from step a), be that of a conventional aqueous emulsion polymerisation process and basically as described above when discussing the use of such a process for the preparation of the acid-functional oligomer. However, an important preferred feature of the invention is that it is often possible to eliminate or much reduce the requirement for the addition of a surfactant to act as an emulsifier in the polymerisation of step b), because the acid functional oligomer itself can fulfil such a function (i.e. act as an emulsifying agent). Thus the aqueous emulsion resulting from step b) preferably contains a very low level of such added emulsifier (surfactant), with usually less than 0.5% (preferably less than 0.25%, and often zero) based on the total weight of monomers charged being used, and with the only surfactant present preferably being that remaining from the oligomer polymerisation (not counting the oligomer itself). In fact the overall level of surfactant (not counting the oligomer itself) is preferably <1% more preferably <0.5%, particularly <0.35%, based on the total weight of monomers charged for the hydrophobic polymer.

The monomer system employed for the formation of the hydrophobic polymer must be such that the resulting polymer is hydrophobic as described. Similar non acid functional, non crosslinking monomers to those used for making the oligomer may be employed, and in particular styrenes, such as styrene itself, α-methlystyrene, o-, m- and p-methylstyrene, o-, m- and p-ethylstyrene, p-chlorostyrene and p-bromostyrene; normal and branched acrylic and methacrylic esters of alkanols (usually 1–12C) and cycloalkanols (usually C5–C12) such as methyl methacrylate, ethyl methacrylate, n-butyl methacrylate, t-butyl methacrylate, 2-ethylhexyl methacrylate, isobornyl methacrylate and cyclohexyl methacrylate and the corresponding acrylates; vinyl esters such as vinyl acetate and vinyl alkanoates; vinyl halides such as vinyl chloride; vinylidene halides such as vinylidene chloride; dienes such as 1,3-butadiene and isoprene—but of course their selection must be such as to provide a resulting Tg which is at least 25° C. above that of the oligomer. A functional monomer(s) for imparting crosslinkability (which is not normally an acid monomer) may optionally be included, examples of which include hydroxy and epoxy functional (meth)acrylates such as hydroxyalkyl (usually C1–C12) methacrylate e.g. 2-hydroxyethyl methacrylate, glycidyl methacrylate, and the corresponding acrylates, as well as keto- and aldehyde-functional monomers such as acrolein, methacrolein and methyl vinyl ketone, acetoacetoxy esters of hydroxyalkyl (usually C1–C12) acrylates and methacrylates such as acetoacetoxyethyl acrylate and methacrylate, and also keto or aldehyde-containing amides such as diacetone acrylamide.

Acid functional monomers could also be included as comonomers (e.g. acrylic or methacrylic acid), although at such a level (depending on their nature) as to not affect the hydrophobic character of the resulting polymer. Generally speaking, the monomer system used to make the hydrophobic polymer will usually contain less than 5 weight % of any acid-functional monomer(s) (no matter of what type), and preferably less than 2 weight %, and in some preferred embodiments none at all.

The hydrophobic polymer is in some cases usefully made from a monomer system which comprises at least one of $C_{1-10}$-alkyl methacrylate (such as n-butyl methacrylate), and $C_{3-10}$-alkyl acrylate (such as n-butyl acrylate), and usually diacetone acrylamide and/or acetoacetoxy ethyl methacrylate.

The polymerisation to make the hydrophobic polymer could be carried out using a chain transfer agent, but (unlike in the preparation of the oligomer) is usually effected without the use of such a material.

The number average molecular weight of the hydrophobic polymer is usually ≧50,000, more usually ≧100,000. The upper limit does not usually exceed 5,000,000.

The Tg of the hydrophobic polymer should be at least 25° C. higher, more preferably at least 40° C. higher than the Tg of the oligomer. Usually, the Tg of the hydrophobic polymer will be within the range of from −10° to 120° C., more usually from 20° to 110° C.

The aqueous solution of the oligomer of step a) is present during the emulsion polymerisation of step b) to make the hydrophobic polymer.

The presence of the oligomer in the polymerisation of step b) can be effected in various ways, with the following being exemplary.

In one embodiment the aqueous solution of the oligomer is admixed with all of the monomers to be used in the formation of the hydrophobic polymer and an otherwise conventional "all-in-one" batch polymerisation (with no further addition of monomer(s)) is carried out to make the latter.

In another embodiment, the polymerisation is basically still a batch one, with all of the oligomer solution being present in the polymerisation vessel prior to the start of polymerisation with some of the monomer system for the hydrophobic polymer, with the remainder of the monomer system for the hydrophobic polymer being added quickly in one addition a while after the polymerisation has commenced.

In a further embodiment, the polymerisation is still basically a batch one, with all of the oligomer solution being present in the polymerisation vessel prior to the start of the polymerisation, but the monomer system for the hydrophobic polymer is now split into several equal parts (batches). These parts are added and polymerised consecutive to one another in order to obtain more control over the polymerisation; therefore effectively it is a polybatch method.

In other embodiments, semi-batch processes are employed in which part (or none) of the monomer system for the hydrophobic polymer is present prior to the start of polymerisation in the polymerisation reaction vessel and part (or the entire amount) is fed to the reaction medium in the polymerisation vessel during the course of polymerisation.

In one such embodiment, the aqueous oligomer solution is present (in part) in the reaction medium for the polymerisation while part of the aqueous oligomer solution is mixed with the entire monomer system for the hydrophobic polymer (acting as an emulsifier) and the latter fed to the reaction medium in the polymerisation vessel during the polymerisation.

In another embodiment, the entire oligomer solution is present in the reaction vessel prior to the start of polymerisation and the entire monomer system for the hydrophobic polymer is fed to the vessel during the polymerisation, i.e. there is no oligomer present in the monomer feed.

In a further embodiment, all of the aqueous oligomer solution is present in the reaction vessel prior to the start of the polymerisation together with part of the monomer system for the hydrophobic polymer, and the remainder of the monomer system fed during polymerisation (i.e. without oligomer in the feed).

In a still further embodiment part of the oligomer solution is present in the reaction vessel prior to start of the polymerisation together with part of the monomer system for the hydrophobic polymer, and the remainder of the monomer system admixed with the remainder of the oligomer solution is fed during polymerisation.

In at least some embodiments of the invention, it is believed that the aqueous emulsion produced after the formation of the hydrophobic polymer may be in the form of an "inverted core-shell" latex, in which the hydrophobic polymer has formed a core domain in the oligomer—with oligomer encapsulating the hydrophobic polymer particles or forming a shell round them, or carrying the hydrophobic polymer particles in its swollen matrix. Alternatively, it may be more realistic to speak of the oligomer simply in terms of being a seed for the polymerisation process to form the hydrophobic polymer—irrespective of the actual structure of the resulting polymer system that is produced, of which we are not entirely certain. Accordingly, we do not wish to be bound by any physical structure which might be assumed or proposed for the resulting aqueous latex of the polymer system of the invention.

Preferably the amount of crosslinking agent in step c) that is employed is such that the ratio of the number of crosslinker groups present in the oligomer and (if employed) in the hydrophobic polymer to the number of reactive groups (for crosslinking purposes) in the crosslinking agent is within the range of from $10/1$ to $1/3$, preferably $2/1$ to $1/1.5$.

The crosslinker in step c) is usually combined with the aqueous emulsion from step b) by adding thereto after the polymerisation of step b) (sometimes just before use of the composition), although it may in principle also be combined by performing the polymerisation of step b) in the presence of the crosslinking agent, i.e. steps c) and b) become combined. A combination of both incorporation expedients may also in principle be used.

It is a preferred feature of the invention that the low molecular weight of the oligomer produced in step a) is achieved using a process which is other than that known to the art as catalytic chain transfer polymerisation, the use of which is not usual in the process of this invention, although it may in principle be used. This process is that where a low molecular weight polymer is produced using the technique of radical polymerisation, using a free-radical initiator, in which molecular weight is controlled using a catalytic amount of a transition metal complex, and in particular a cobalt chelate complex, this technique being known in the art as a catalytic chain transfer (CCT) polymerisation. Such a technique has been described fairly extensively in the literature within the last decade or so. For example, various literature references, such as N. S. Enikolopyan et al, J.Polym.Sci., Polym.Chem.Ed., Vol 19, 879 (1981), disclose the use of cobalt II porphyrin complexes as chain transfer agents in free radical polymerisation, while U.S. Pat. No. 4,526,945 discloses the use of dioxime complexes of cobalt II for such a purpose. Various other publications, e.g. U.S. Pat. No. 4,680,354, EP-A-0196783 and EP-A-0199436, describe the use of certain other types of cobalt II chelates as chain transfer agents for the production of oligomers of olefinically unsaturated monomers by free-radical polymerisation. WO-A-87/03605 on the other hand claims the use of certain cobalt III chelate complexes for such a purpose, as well as the use of certain chelate complexes of other metals such as iridium and rhenium. Finally, copending application PCT/GB94/01692 (publication WO-A-95/0476 published 16.2.95) discloses a process for the preparation of an aqueous polymer emulsion which in one embodiment comprises a) preparing an aqueous solution of an acid-functional oligomer using a CCT polymerisation process and b) conducting an aqueous emulsion polymerisation to form a hydrophobic polymer in the presence of the oligomer solution. Both the oligomer and hydrophobic polymer may optionally include crosslinker groups and the composition can optionally include crosslinker groups and the composition can optionally include a crosslinking agent. The disclosure does not discuss or teach a process having the selection of features and integers as defined in the invention process. In particular, none of the example compositions include an oligomer with crosslinker groups, none have oligomers with Tg below 50° C., and none have hydrophobic polymers with Tg calculated to be at least 25° C. higher than the Tg of the oligomer.

It will be appreciated that the oligomer and optionally the hydrophobic polymer possess functional groups for imparting latent crosslinkability to the composition (i.e. so that crosslinking takes place e.g. after the formation of a coating therefrom) when combined with the crosslinking agent in step c). For example, one or both polymers could carry functional groups such as hydroxyl groups and the composition subsequently formulated in step c) with a crosslinking agent such as a polyisocyanate, melamine, or glycoluril; or the functional groups on one or both polymers could include keto or aldehyde carbonyl groups and the subsequently formulated crosslinker in step c) could be a polyamine or polyhydrazide such as adipic acid dihydrazide, oxalic acid dihydrazide, phthalic acid dihydrazide, terephthalic acid dihydrazide, isophorone diamine and 4,7-dioxadecene-1,10 diamine. It will be noted that such crosslinking agents will effect crosslinking with the functional crosslinker groups of the oligomer and also of the hydrophobic polymer (if present) by virtue of forming covalent bonds, and are not crosslinking agents which would effect crosslinking by virtue of the formation of ionic bonds, as e.g. by the addition of metal ions to react with polymer-bound carboxylate ions.

The minimum film forming temperature (MFFT) of a composition as used herein is the temperature where the composition forms a smooth and crackfree coating or film using DIN 53787 and applied using a Sheen MFFT bar SS3000.

Koenig hardness as used herein is a standard measure of hardness, being a determination of how the viscoelastic properties of a film formed from the composition slows down a swinging motion deforming the surface of the film, and is measured according to DIN 53157 NEN5319.

As is well known, the glass transition temperature of a polymer is the temperature at which it changes from a glassy, brittle state to a plastic, rubbery state.

The solids content of an aqueous composition of the invention is usually within the range of from about 20 to 65 wt % on a total weight basis, more usually 30 to 55wt %. Solids content can, if desired, be adjusted by adding water or removing water (e.g. by distillation or ultrafiltration).

The relative amounts of the oligomer and the hydrophobic polymer in the aqueous polymer composition are preferably such that the weight % of the oligomer, based on the weight of the oligomer plus the hydrophobic polymer in the polymer composition, is preferably within the range of from 1 to 70 weight %, more preferably 5 to 50 weight %.

The aqueous compositions of the invention may be used in various applications and for such purposes may be further optionally combined or formulated with other additives or components, such as defoamers, rheology control-agents, thickeners, dispersing and stabilizing agents (usually surfactants), wetting agents, fillers, extenders, fungicides, bacteriocides, coalescing and wetting solvents (although solvents are not normally required), plasticisers, anti-freeze agents, waxes and pigments.

The aqueous compositions may e.g. be used, appropriately formulated if necessary, for the provision of films, polishes, varnishes, lacquers, paints, inks and adhesives. However, they are particularly useful and suitable for providing the basis of protective coatings for wooden substrates (e.g. wooden floors), and plastics, paper and metal substrates.

The compositions once applied may be allowed to dry naturally at ambient temperature, or the drying process may be accelerated by heat. Crosslinking can be developed by allowing to stand for a prolonged period at ambient temperature (several days) or by heating at an elevated temperature (e.g. 50° C.) for a much shorter period of time.

The present invention is now further illustrated, but in no way limited, by reference to the following examples. Unless otherwise specified all parts, percentages, and ratios are on a weight basis.

The glass transition temperatures of the oligomers in the examples use the values in °C. determined experimentally using differential scanning calorimetry DSC, taking the peak of the derivative curve as Tg, or calculated from the Fox equation (as for the hydrophobic polymers—see following).

The glass transition temperatures of the hydrophobic polymers in the examples were calculated by means of the Fox equation. Thus the Tg, in degrees Kelvin, of a copolymer having "n" copolymerised comonomers is given by the weight fractions W of each comonomer type and the Tg's of the homopolymers (in degrees Kelvin) derived from each comonomer according to the equation:

$$\frac{1}{Tg} = \frac{W_1}{Tg_1} + \frac{W_2}{Tg_2} + \ldots \frac{W_n}{Tg_n}$$

The calculated Tg in degrees Kelvin may be readily converted to °C. (If the hydrophobic polymer is a homopolymer, its Tg is simply that of the polymerised monomer—normally available from the literature).

In the examples the following abbreviations are used.

| | |
|---|---|
| AP | ammonium persulphate |
| BA | n-butylacrylate |
| t-BHPO | tert-butyl hydroperoxide |
| BMA | n-butylmethacrylate |
| DAAM | diacetone acrylamide |
| EDTA | ethylenediamine tetraacetic acid |
| LMKT | lauryl mercaptan (chain transfer agent) |
| MAA | methacrylic acid |
| MMA | methylmethacrylate |
| 3-MPA | 3-mercapto propionic acid (chain transfer agent) |
| SLS | sodium lauryl sulphate |
| TM | total monomers |
| s/s | solids/solids |
| SA | stoichiometric amount |
| FM | free monomer content |
| ADH | adipic acid dihydrazide |
| ALMA | allyl methacrylate |
| RT | room temperature |

The recipe and procedure for the preparation of an aqueous solution of an acid-functional oligomer A for use in the invention process is as follows.

Recipe for Oligomer A
  Composition BA/MMA/MAA/DAAM=60/24/8/8
  Akyposal SLS (sodium lauryl sulphate emulsifying agent): 0.5% on TM (s/s) 25% in the reactor; 75% in the feed
  AP: 0.3% on TM (s/s). Added as a separate feed during emulsion polymerisation (solids of the feed is 1.5% in demin. water)
  LMKT: 1.6% on TM (in the feed)
  3-MPA: 0.8% on TM (in the feed)
  Neutralisation: 2 SA NH$_3$ Solids of the neutralized solution: 27.5%

Logsheet and procedure for the preparation of oligomer A

| Nr | Component | Amount (g) |
|----|-----------|------------|
| 1  | H$_2$O (demin) | 876.49 |
| 2  | Akyposal SLS | 2.00 |
| 3  | AP (1.5% (s/s) in demin water) | 95.93 |
| 4  | H$_2$O | 207.07 |
| 5  | Akyposal SLS | 6.00 |
| 6  | LMKT | 7.67 |
| 7  | 3-MPA | 3.84 |
| 8  | BA | 287.79 |
| 9  | MMA | 115.12 |
| 10 | MAA | 38.37 |
| 11 | DAAM | 38.37 |
| 12 | NH$_3$ (12.5%) | 121.36 |

Charge 1 and 2 to the reactor. Heat the reactor contents to 70° C. and add 5% of the preemulsified feed 4–11. Heat the reactor contents to 80° C. Add 30% of 3 to the reactor. Keep the reactor contents for 5 minutes at 80° C. Start feeding the preemulsified feed 4–11 and the initiator feed 3. The reaction temperature is 85±2° C. The monomer feed should take 60 minutes, the initiator feed should take 70 minutes. Keep the reactor contents at 85° to 90° C. for 30 minutes. Cool down to 80° C. and add 12 slowly (the viscosity increased although there was not complete dissolution). Keep the reactor contents at 80±20° C. for another 30 minutes. Cool down to 25° C.

Specifications
 solids (%): 26.8
 pH: 9.8
 viscosity (mpas at 25° C.): 18000
 sediment after sieving (%): 0.15
 FM (%): <0.1
 Tg (measured by DSC) (°C.): 0
 Mn: 9600
 d: 2.5

EXAMPLE 1

The recipe and procedure for the preparation of an invention composition by the "batch" method is as follows.

Recipe
 Composition
 Oligomer Part: see Oligomer A above Polymer part: MMA/BMA/DAAM/53/43/4 Tg (polymer part, calculated) (°C.); 62° C.
 Oligomer/polymer (s/s): 100/100 (=50/50) All oligomer in the reactor.

Monomer mixture and initiator system added in three parts with ratio 34/33/33 t-BHPO: 0.26% on TM. Added to the reactor as a 30% (s/s) slurry in demin. water. i-Ascorbic acid: 0.05% on TM. Added to the reactor as a 1% (s/s) solution in demin water. FeEDTA: 0.01% on TM. Added to the reactor as a 1% (s/s) solution in demin. water. i-Ascorbic acid: 0.21% on TM. Added as a feed (1% (s/s) solution in demin. water).

Solids: 37.5%.

Logsheet and procedure for the preparation of the composition of Example 1

| Nr | Component | Amount (g) |
|----|-----------|------------|
| 1  | H$_2$O | 88.29 |
| 2  | oligomer A solution | 900.38 |
| 3  | t-BHPO 30% (s/s) in demin. water) | 0.72 |
| 4  | i-ascorbic acid (1% (s/s) in demin. water) | 4.13 |
| 5  | FeEDTA (1% (s/s) solution*) | 1.08 |
| 6  | i-ascorbic acid (1% (s/s) in demin.water) | 17.36 |
| 7  | MMA | 43.81 |
| 8  | BMA | 35.54 |
| 9  | DAAM | 3.31 |
| 10 | t-BHPO (30% (s/s) in demin. water) | 0.70 |
| 11 | i-ascorbic acid (1% (s/s) in demin. water) | 4.01 |
| 12 | FeEDTA (1% (s/s) solution*) | 1.04 |
| 13 | i-ascorbic acid (1% (s/s) in demin. water) | 16.85 |
| 14 | MMA | 42.52 |
| 15 | BMA | 34.50 |
| 16 | DAAM | 3.21 |
| 17 | t-BHPO (30% (s/s) in demin. water) | 0.70 |
| 18 | i-ascorbic acid (1% (s/s) in demin. water) | 4.01 |
| 19 | FeEDTA (1% (s/s) solution*) | 1.04 |
| 20 | i-ascorbic acid (1% (s/s) in demin. water) | 16.85 |
| 21 | MMA | 42.52 |
| 22 | BMA | 34.50 |
| 23 | DAAM | 3.21 |
| 24 | H$_2$O | 10.00 |
| 25 | ADH | 13.40 |

*Made from FeSO$_4$, EDTA, NaOH and demin. water.

Charge 1 and 2 to the reactor. Add 7–9 to the reactor and heat the batch to 35° C. Keep the batch at this temperature for 30 minutes. Add 3–5 to the reactor. The temperature of the batch will rise. Keep the batch at the peak temperature for 15 minutes. Feed 6 in 30 minutes into the reactor. Let the temperature drift during the feeding of 6 and 15 minutes afterwards. Cool down to 35° C. Add 14–16 to the reactor and keep the batch at 35° C. for 15 minutes. Add 10–12, the temperature will rise. Keep the batch at peak temperature for 15 minutes. Feed 13 into the reactor in 30 minutes. Let the temperature drift during the addition and 15 minutes afterwards. Cool down to 35° C. Add 21–23 to the reactor. Keep the batch at 35° C. for 30 minutes. Add 17–19, the temperature will rise. Keep the batch at peak temperature for 15 minutes. Feed 20 into the reactor in 30 minutes. Let the temperature drift during the addition and 15 minutes afterwards. Add 25 at 40°–45° C., followed by 24. Keep the batch at 40°–45° C. for 30 minutes and cool down to 25° C.

Specifications
 hardness (Koenig) (sec): 128
 MFFT (°C): 0

EXAMPLE 2

The recipe and procedure for the preparation of an invention composition by the "batch" method is as follows.

Recipe
 Composition
 Oligomer part: see Oligomer A Polymer part: MMA/BMA/DAAM =51.64/45.36/3. Tg (polymer part, calculated) (°C.): 60° C.
 oligomer/polymer (s/s): 60/100 (=37.5/62.5). All oligomer in the reactor.

Monomer mixture and initiation system added in three parts with ratio 34/33/33/ t-BHPO: 0.26% on TM. Added to the reactor as a 30% (s/s) slurry in demin. water. i-Ascorbic acid: 0.05% on TM. Added to the reactor as a 1% (s/s) solution in demin. water. FeEDTA: 0.01% on TM. Added to the reactor as a 1% (s/s) solution in demin. water. i-Ascorbic acid: 0.21% on TM. Added as a feed (1% (s/s) solution in demin. water).

Solids: 37.5%.

Logsheet and procedure for the preparation of the composition of Example 2

| Nr | Component | Amount (g) |
|---|---|---|
| 1 | $H_2O$ | 272.60 |
| 2 | oligomer A solution | 778.66 |
| 3 | t-BHPO (30% (s/s) in demin. water) | 1.02 |
| 4 | i-ascorbic acid (1% (s/s) in demin. water) | 5.957 |
| 5 | FeEDTA (1% (s/s) solution[1]) | 1.55 |
| 6 | i-ascorbic acid (1% (s/s) in demin.water) | 25.02 |
| 7 | MMA | 61.52 |
| 8 | BMA | 54.04 |
| 9 | DAAM | 3.57 |
| 10 | t-BHPO (30% (s/s) in demin. water) 0.70 | 1.00 |
| 11 | i-ascorbic acid (1% (s/s) in demin. water) | 5.78 |
| 12 | FeEDTA (1% (s/s) solution*) | 1.50 |
| 13 | i-ascorbic acid (1% (s/s) in demin. water) | 24.28 |
| 14 | MMA | 59.71 |
| 15 | BMA | 52.45 |
| 16 | DAAM | 3.47 |
| 17 | t-BHPO (30% (s/s) in demin. water) | 1.00 |
| 18 | i-ascorbic acid (1% (s/s) in demin. water) | 5.78 |
| 19 | FeEDTA (1% (s/s) solution*) | 1.50 |
| 20 | i-ascorbic acid (1% (s/s) in demin. water) | 24.28 |
| 21 | MMA | 59.71 |
| 22 | BMA | 52.45 |
| 23 | DAAM | 3.47 |
| 24 | $H_2O$ | 10.00 |
| 25 | ADH | 9.77 |

*Made from $FeSO_4$, EDTA, NaOH and demin. water.

Charge 1 and 2 to the reactor. Add 7–9 to the reactor and heat the batch to 35° C. Keep the batch at this temperature for 30 minutes. Add 3–5 to the reactor. The temperature of the batch will rise. Keep the batch at the peak temperature for 15 minutes. Feed 6 in 30 minutes into the reactor. Let the temperature drift during the feeding of 6 and for 15 minutes afterwards. Cool down to 35° C. Add 14–16 to the reactor and keep the batch at 35° C. for 15 minutes. Add 10–12, the temperature will rise. Keep the batch at peak temperature for 15 minutes. Feed 13 into the reactor in 30 minutes. Let the temperature drift during the addition and 15 minutes afterwards. Cool down to 35° C. Add 21–23 to the reactor. Keep the batch at 35° C. for 30 minutes. Add 17–19, the temperature will rise. Keep the batch at peak temperature for 15 minutes. Feed 20 into the reactor in 30 minutes. Let the temperature drift during the addition and 15 minutes afterwards. Add 25 at 40°–45° C., followed by 24. Keep the batch at 40°–45° C. for 30 minutes and cool down to 25° C.

Specification
  solids (%): 37.6
  pH: 9.3
  viscosity (mpas at 25° C.): 615
  sediment after sieving (%): 0.05
  FM (%) : <0.1
  hardness (Koenig) (sec): 131
  MFFT (°C.: 20

The recipe and procedure for the preparation of an aqueous solution of a further acid-functional oligomer B for use in the invention process is as follows.

Recipe for oligomer B
Composition
BA/MMA/MAA/DAAM=52.57/31.43/8/8
Akyposal SLS (sodium lauryl sulfate emulsifying agent): 0.5% on TM (s/s). 25% in the reactor; 75% in the feed.
AP:0.3% on TM (s/s). Added as a separate feed during emulsion polymerisation (solids of the feed is 1.5% in demin. water).
LMKT: 1.6% on TM (in the feed).
3-MPA: 0.8% on TM (in the feed).
Neutralisation: 2 SA $NH_3$.
Solids of the neutralized solution; 27.5%.

Logsheet and procedure for the preparation of oligomer B

| Nr | Component | Amount (g) |
|---|---|---|
| 1 | $H_2O$ (demin) | 876.49 |
| 2 | Akyposal SLS | 2.00 |
| 3 | AP (1.5% (s/s) in demin. water) | 95.93 |
| 4 | $H_2O$ | 207.07 |
| 5 | Akyposal SLS | 6.00 |
| 6 | LMKT | 7.67 |
| 7 | 3-MPA | 3.84 |
| 8 | BA | 252.16 |
| 9 | MMA | 150.75 |
| 10 | MAA | 38.37 |
| 11 | DAAM | 38.37 |
| 12 | $NH_3$ (12.5%) | 121.36 |

Charge 1 and 2 to the reactor. Heat the batch to 70° C. and add 5% of the preemulsified feed 4–11. Heat the batch to 80° C. Add 30% of 3 to the reactor. Keep the batch for 5 minutes at 80° C. Heat the batch to 85° C. Start feeding the preemulsified feed 4–11 and the initiator feed 3. The reaction temperature is 85±20° C. The monomer feed should take 60 minutes, the initiator feed should take 70 minutes. Keep the batch at 85° to 90° C. for 30 minutes. Cool down to 80° C. and add 12 slowly (the viscosity increased although there was not complete dissolution). Keep the batch at 80±2° C. for another 30 minutes. Cool down to 25° C.

Specifications
  solids: 27.5
  pH: 9.5
  viscosity (mpas at 25° C.): 176000
  sediment after sieving (%): 0.10
  FM (%): <0.10
  Tg (measured by DSC) (°C.): 10

EXAMPLE 3

The recipe and procedure for the preparation of an invention composition by the "batch" method is as follows.

Recipe
Composition
Oligomer part: See Oligomer B above. Polymer part: MMA/BMA/DAAM =51.64/45.36/3/ Tg (polymer part, calculated) (°C.); 60° C.
Oligomer/polymer (s/s): 60/100 (=37.5/62.5) All oligomer in the reactor.
Monomer mixture and initiation system added in three parts with ratio 34/33/33 t-BHPO; 0.26% on TM. Added to the reactor as a 30% (s/s) slurry in demin. water. i-Ascorbic acid: 0.05% on TM. Added to the reactor as a 1% (s/s) solution in demin. water. FeEDTA: 0.01% on TM. Added to the reactor as a 1% (s/s) solution in demin. water. i-Ascorbic acid; 0.21% on TM. Added as a feed (1% (s/s) solution in demin. water).
Solids: 37.5%.

Logsheet and procedure for the preparation of the composition of Example 3

| Nr | Component | Amount (g) |
|---|---|---|
| 1 | $H_2O$ | 272.60 |
| 2 | oligomer B solution | 778.66 |
| 3 | t-BHPO (30% (s/s) in demin. water) | 1.03 |

-continued

Logsheet and procedure for the preparation of the composition of Example 3

| Nr | Component | Amount (g) |
|---|---|---|
| 4 | i-ascorbic acid (1% (s/s) in demin. water) | 5.957 |
| 5 | FeEDTA (1% (s/s) solution[1]) | 1.55 |
| 6 | i-ascorbic acid (1% (s/s) in demin.water) | 25.02 |
| 7 | MMA | 61.52 |
| 8 | BMA | 54.04 |
| 9 | DAAM | 3.57 |
| 10 | t-BHPO (30% (s/s) in demin. water) 0.70 | 1.00 |
| 11 | i-ascorbic acid (1% (s/s) in demin. water) | 5.78 |
| 12 | FeEDTA (1% (s/s) solution*) | 1.50 |
| 13 | i-ascorbic acid (1% (s/s) in demin. water) | 24.28 |
| 14 | MMA | 59.71 |
| 15 | BMA | 52.45 |
| 16 | DAAM | 3.47 |
| 17 | t-BHPO (30% (s/s) in demin. water) | 1.00 |
| 18 | i-ascorbic acid (1% (s/s) in demin. water) | 5.78 |
| 19 | FeEDTA (1% (s/s) solution*) | 1.50 |
| 20 | i-ascorbic acid (1% (s/s) in demin. water) | 24.28 |
| 21 | MMA | 59.71 |
| 22 | BMA | 52.45 |
| 23 | DAAM | 3.47 |
| 24 | $H_2O$ | 10.00 |
| 25 | ADH | 9.77 |

*Made from $FeSO_4$, EDTA, NaOH and demin. water.

Charge 1 and 2 to the reactor. Add 7–9 to the reactor and heat the batch to 35° C. Keep the batch at this temperature for 30 minutes. Add 3–5 to the reactor. The temperature of the batch will rise. Keep the batch at peak temperature for 15 minutes. Feed 6 in 30 minutes into the reactor. Let the temperature drift during the feeding of 6 and for 15 minutes afterwards. Cool down to 35° C. Add 14–16 to the reactor and keep the batch at 35° C. for 15 minutes. Add 10–12, the temperature will rise. Keep the batch at peak temperature for 15 minutes. Feed 13 into the reactor in 30 minutes. Let the temperature drift during the addition and 15 minutes afterwards. Cool down to 35° C. Add 21–23 to the reactor. Keep the batch at 35° C. for 30 minutes. Add 17–19, the temperature will rise. Keep the batch at peak temperature for 15 minutes. Feed 20 into the reactor in 30 minutes. Let the temperature drift during the addition and 15 minutes afterwards. Add 25 at 40°–45° C., followed by 24. Keep the batch at 40°–45° C. for 30 minutes and cool down to 25° C.

Specifications
  solids (%): 37.5
  pH: 9.4
  viscosity (mpas at 25° C.): 48
  sediment after sieving (%): 0.05
  FM (%): <0.10
  hardness (Koenig) (sec): 160
  MFFT (°C.): 22

All oligomer/polymer compositions (Examples 1, 2, and 3) were cast on "test charts" and resistances of the dried films were tested according to the following procedure. 80μm Wet films were cast down on test charts (Leneta Company, Form 2C) and dried for 30 minutes at room temperature, followed by 16 hours at 52° C. The charts were then cooled down to room temperature. Droplets of the testing liquids (water, ethanol (48% w/w), coffee and "Andy" (commonly used Dutch detergent) were placed on the coating and covered with a glass plate. The liquids were removed after 16 hours and the coatings were assessed immediately and after four hours recovery. "Hot pan" test was done as follows. A beaker with boiling water was placed on the wetted coating and removed after the water had cooled down to room temperature. Assessment of the coating was the same as for the other tests.

0 Means that the coating is very severely affected by the test. Often cracking and/or white spots are observed.
1. Means that the coating is severely affected by the test.
2. Means that the coating is affected by the test.
3. Means that the coating is affected by the test, but not as bad as in the former cases.
4. Means that the coating is hardly affected by the test.
5. Means that the coating is not affected at all by the test.

| Example | Water | | Ethanol (48% w/w) | | Coffee | | Detergent Andy | | Hot pan | |
|---|---|---|---|---|---|---|---|---|---|---|
| | i | a | i | a | i | a | i | a | i | a |
| 1 | 5 | 5 | 3 | 3 | 2 | 2 | 4–5 | 4–5 | 4–5 | 4–5 |
| 2 | 5 | 5 | 3 | 4 | 3 | 3 | 4–5 | 4–5 | 3 | 4 |
| 3 | 5 | 5 | 3 | 4 | 4 | 4 | 4–5 | 4–5 | 3 | 4 | i: immediately after the testing liquid has been removed.
a: after recovery.

It will be noted that all the compositions prepared by the process of the invention had a superb balance of MFFT and Koenig hardness, excellent water resistance, and reasonable to excellent resistance to ethanol, coffee, detergent and the hot pan test.

An aqueous solution of an acid-functional oligomer C was prepared having no crosslinker monomer for the purpose of providing subsequent covalent crosslinking (in an oligomer/polymer composition) after coating formation, but instead-having a difunctional monomer (ALMA) for effecting grafting (or precrosslinking) during the formation of the oligomer/polymer composition.

Recipe for oligomer C
  Composition BA/MMA/ALMA/MAA=65/24/1/10
  SLS (emulsifying agent): 0.5% on TM (s/s)
  AP: 0.3% on TM (1.5% in demin water)
  LMKT: 2.2% on TM Logsheet and procedure for preparation of the oligomer C

| Nr | Component | Amount (g) |
|---|---|---|
| 1 | $H_2O$ | 1070.6 |
| 2 | AP (1.5% in demin water) | 87.3 |
| 3 | SLS (sodium lauryl sulphate 30% solids) | 1.8 |
| 4 | $H_2O$ | 188.2 |
| 5 | MMA | 104.8 |
| 6 | MAA | 43.7 |
| 7 | BA | 283.8 |
| 8 | SLS | 5.5 |
| 9 | LMKT | 9.8 |
| 10 | $NH_2$ (12.5%) | 138.1 |
| 11 | ALMA | 4.4 |

Charge 1 and 3 to the reactor. Heat the reactor contents to 70° C. and add 5% of the pre-emulsified feed 4–9. Heat the reactor contents to 80° C. and charge 30% of 2 to the reactor and wait for 5 minutes. With the reactor contents at 85° C. start feeding 4–8 over a period of 60 minutes. Also feed 2 over 70 minutes. Rinse the feedtank with water and keep the reactor at 85° C. for another 30 minutes. Slowly add 11 to the reactor and keep at 80° C. for another 30 minutes. The oligomer will dissolve or partly dissolve in this time. Cool down to 25° C.

Specifications
  solids: 25%
  pH: 10
  viscosity (mpas @ 25° C.): 775
  sediment: <0.2%

FM: <100 ppm
Tg (calc. °C.): 0

EXAMPLE C4

In this comparative example, a polymer composition is prepared using the oligomer C in order to yield a product with grafting (pre-crosslinking) between the oligomer and polymer phases in the resulting emulsion composition (i.e. as in the preferred process of EP 0,587,333). A polybatch procedure was used. (The composition had oligomer/hydrophobic polymer Tg values in accordance with the requirements of the invention process).

Recipe

Composition Oligomer part: Oligomer C Polymer part: MMA/BMA =54.6/45.4 Tg polymer part: 60° C.
  oligomer/polymer (s/s): 60/100
  initiator system (tBHPO, i-ascorbic acid, FeEDTA; see table)
  final solids: 30%
all oligomer in reactor.

Logsheet and procedure for preparation of Example C4

|   | Component | Amount (g) |
|---|---|---|
| 1 | Water | 436.8 |
| 2 | Oligomer C solution | 941.9 |
| 3 | MMA | 214.3 |
| 4 | BMA | 178.2 |
| 5 | tBHPO (30% slurry in demin water) | 3.4 |
| 6 | FeEDTA (1% solution) | 5.1 |
| 7 | i ascorbic acid 5% in demin water | 3.9 |
| 8 | i ascorbic acid 5% in demin water | 16.4 |

Charge 1 and 2 to the reactor and 3 and 4 to the feedtank. Heat the reactor contents to 35° C. Add 50% of 3 and 4 to the reactor and mix for 30 minutes. Add 50% of 5, 6 and 7 to the reactor and the polymerisation will start. Let the temperature drift to appr. 55° C. Keep at this temperature for 15 minutes. Feed 50% of 8 in 30 minutes. Cool to 35° C. and repeat this procedure for the other 50% of the components. Cool to RT.

Specifications
  solids: 30%
  pH: 9.7
  viscosity (mPas at 25° C.): 352
  sediment: <0.2%
  MFFT (°C.): 34
  Koenig hardness: 119 sec The balance of hardness and MFFT achieved in Example C4 may be reasonably compared with that of the invention composition of Example 2 having a similar oligomer and hydrophobic polymer composition (apart from the DAAM in oligomer A of Ex 1 and ALMA in oligomer C of Ex C4) and also both having a 60/100 oligomer/polymer ratio and with oligomer Tg's in both the compositions of Examples 2 and C4 being 0° C. and the hydrophobic polymer Tg's both being 60° C.

|  | MFFT (°C.) | Koenig Hardness (sec) |
|---|---|---|
| Example 2 | 20 | 131 |
| Example C4 | 34 | 119 |

It will be observed that the MFFT/Koenig hardness of the invention composition of Example 2 is clearly superior to that of Example C4, with that of Example 2 satisfying the relationship $H \geq 1.5T+90$, while that of Example C4 not satisfying the relationship $H > 1.5T+70$.

EXAMPLE C5

In this composition example, an oligomer/hydrophobic polymer composition with keto crosslinking groups is prepared in which the oligomer is solubilized by neutralization in the aqueous phase subsequent to the polymerisation to form the hydrophobic polymer (instead of before effecting this polymerisation—as in all the proceeding examples), this being the preferred technique of EP 0,587,333 to effect solubilization. (The compositions had oligomer/hydrophobic polymer Tg values in accordance with the requirements of the invention process).

Recipe for Example C5

Oligomer phase composition BA/MMA/DAAM/MAA= 60/24/8/8 Tg (calc. °C.): 60
  0.5 SLS (s/s) on TM used as surfactant 0.3 AP (1.5% solution in demin. water) used as a separate initiator feed for both phases
  oligomer/polymer (s/s): 60/100
  neutralization: 1 SA ammonia Logsheet and procedure for preparation of Example C5

| Nr | Component | Amount (g) |
|---|---|---|
| 1 | water | 796.1 |
| 2 | SLS (30% solids) | 2.2 |
| 3 | AP (1.5% in demin water) | 131.3 |
| 4 | water | 105.8 |
| 5 | SLS (30% solids) | 3.3 |
| 6 | LMKT | 14.8 |
| 7 | BA | 141.8 |
| 8 | MMA | 56.7 |
| 9 | DAAM | 18.9 |
| 10 | MAA | 18.9 |
| 11 | BMA | 190.8 |
| 12 | MMA | 216.8 |
| 13 | DAAM | 12.6 |
| 14 | water | 90.0 |
| 15 | ADH | 14.6 |
| 16 | NH$_3$ (12.5%) | 59.8 |
| 17 | water | 10.0 |

Charge 1 and 2 to the reactor and heat to 85° C. Pre-emulsify 4–10 and charge 10% to the reactor. Then charge 20% of 3 to the reactor and wait for 5 minutes. Charge the remainder of the feed (4–10) in 50 minutes and charge 40% of 3 over a period of 60 minutes with the reactor contents at 85° C. This forms the oligomer. Charge 11–13 to the feedtank and feed this to the reactor in an additional 50 minutes. Simultaneously charge the remainder of 3 to the reactor over a period of 60 minutes at 85° C. Rinse the feedtank with 17 and charge to the reactor. Keep at 85° C. for another 30 minutes. This forms the hydrophobic polymer. Then slowly charge 16 to the reactor and wait for another 30 minutes. Cool to 25° C. and add 15 to the reactor rinse with 14.

Specifications
  MFFT (°C.): 48
  Koenig hardness: 140 secs
  solids (%): 37–38
  pH 9.7
  viscosity (mpas at 25° C.): 17
  sediment: <0.1%

The balance of hardness and MFFT achieved in Example C5 may be reasonably compared with that of Example 2, both examples having the same oligomer and hydrophobic polymer compositions and the same oligomer/polymer ratios, as well as having the same oligomer Tg (0° C.) and hydrophobic polymer Tg (60° C.).

|  | MFFT (°C.) | Koenig hardness sec |
| --- | --- | --- |
| Example 2 | 20 | 131 |
| Example C5 | 48 | 140 |

It will be observed that the MFFT/Koenig hardness balance of Example 2 is clearly superior to that of Example C5, with that of Example 2 satisfying the relationship $H \geq 1.5T+90$, while that of Example C5 not satisfying the relationship $H \geq 1.5T+70$.

We claim:

1. Process for the production of an organic solvent-free aqueous crosslinkable polymer composition useful for coating, which process is organic solvent-free and comprises:
   a) preparing an aqueous solution of an acid-functional oligomer built from olefinically unsaturated monomers, said oligomer having a number average molecular weight Mn within the range of from 500 to 50,000 and a glass transition temperature (Tg) below 50° C., said oligomer being formed using an organic solvent-free aqueous emulsion or aqueous solution polymerisation process, and said acid functionality by itself or by neutralization thereof rendering the oligomer water-soluble, and said oligomer also having crosslinker functional groups for imparting crosslinkability when the aqueous polymer composition is subsequently dried,
   b) conducting an aqueous emulsion polymerization process to form an aqueous emulsion of a hydrophobic polymer from at least one olefinically unsaturated monomer in the presence of the aqueous solution of the oligomer, said hydrophobic polymer having a Tg which is at least 25° C. higher than the Tg of said oligomer, and said hydrophobic polymer optionally having crosslinker functional groups for imparting crosslinkability when the aqueous polymer composition is subsequently dried, and
   c) combining the aqueous emulsion from b) with a crosslinking agent by addition of the crosslinking agent after the polymerisation in step b) and/or performing the polymerisation in the presence of the crosslinking agent, said crosslinking agent being reactable with the crosslinker functional groups of the oligomer and (if present) of the hydrophobic polymer on subsequent drying to effect crosslinking, wherein said crosslinking agent is not an agent which effects crosslinking by the formation of ionic bonds,
   and wherein further, said polymer composition on drying has a Koenig hardness of at least 40 sec and said polymer composition has a minimum film forming temperature of $\leq 55°$ C.

2. Process according to claim 1 wherein said oligomer has a number average molecular weight of from 2,000 to 25,000.

3. Process according to claim 1 wherein said oligomer has a Tg within the range of from −75 to <50° C.

4. Process according to claim 3 wherein said oligomer has a Tg within the range of from −50° C. to <20° C.

5. Process according to claim 1 wherein said hydrophobic polymer has a Tg which is at least 40° C. higher than the Tg of the oligomer.

6. Process according to claim 1 wherein said polymer composition on drying has a Koenig hardness of from 60 to 200 secs.

7. Process according to claim 1 wherein said polymer composition has a minimum film forming temperature of from 0° to 55° C.

8. Process according to claim 7 wherein said polymer composition has a minimum film forming temperature of from 0° to 30° C.

9. Process according to claim 1 wherein the resulting composition has Koenig hardness and minimum film forming temperature according to the following empirical relationship:

$$H \geq 1.5T+70$$

where H is Koenig hardness in seconds and T is minimum film forming temperature in °C.

10. Process according to claim 9 wherein the empirical relationship is:

$$H \geq 1.5T+90.$$

11. Process according to claim 1 wherein said oligomer is completely or partially, dissolved in the aqueous medium in step a).

12. Process according to claim 11 wherein dissolution of the oligomer is effected by neutralization of the acid groups thereof using a base.

13. Process according to claim 1 wherein said oligomer is derived from an olefinically unsaturated monomer system which includes an acid-bearing comonomer(s), or a comonomer(s) bearing an acid-forming group which yields, or is subsequently convertible to, such an acid group, and a comonomer(s) which has a functional group(s) for imparting crosslinkability.

14. Process according to claim 13 wherein the acid bearing monomer(s) is selected from the group consisting of carboxyl-containing olefinically unsaturated monomer(s).

15. Process according to claim 14 wherein the monomer (s) is selected from the group consisting of carboxyl-functional acrylic monomers.

16. Process according to claim 14 wherein said carboxyl bearing monomer(s) is selected from the group consisting of acrylic acid, methacrylic acid, itaconic acid and fumaric acid.

17. Process according to claim 13 wherein said monomer system from which the oligomer is formed includes a non-acid functional non-crosslinking comonomer(s) selected from the group consisting of acrylate and methacrylate esters; styrenes, dienes, vinyl esters, nitrites, and olefinically unsaturated halides.

18. Process according to claim 17 wherein said non-acid functional non-crosslinking comonomer(s) is selected from the group consisting of normal and branched alkyl esters of C1 to C12 alcohols and acrylic acid or methacrylic acid; and cycloalkyl acrylates or methacrylates; styrene itself, α-methyl styrene and t-butylstyrene; acrylonitrile and methacrylonitrile; vinyl chloride, vinylidene chloride and vinyl fluoride; vinyl acetate and vinyl alkanoates; isoprene and 1,3-butadiene.

19. Process according to claim 13 wherein the functional groups for providing crosslinkability are selected from the group consisting of epoxy, hydroxyl, ketone and aldehyde groups.

20. Process according to claim 13 wherein said comonomer(s) with functional groups for imparting crosslinkability is (are) selected from the group consisting of glycidyl acrylate and methacrylate, hydroxyalkyl methacrylates and acrylates, acrolein, methacrolein and methyl vinyl ketone, the acetoacetoxy esters of hydroxyalkyl acrylates and methacrylates, and keto-containing amides.

21. Process according to claim 13 wherein the acid-functional oligomer is derived from a monomer system comprising 1 to 45 weight % of acid-functional comonomer (s), 0.5 to 20 weight % of crosslinking comonomer(s) and 98.5 to 50 weight % of non-acid functional, non-crosslinking comonomer(s).

22. Process according to claim 21 wherein said oligomer is derived from a monomer system comprising 3 to 30 weight % of acid-functional comonomer(s), 1 to 15 weight % of crosslinking comonomer(s) and 96 to 65 weight % of non-acid functional, non-crosslinking comonomer(s).

23. Process according to claim 21 wherein the acid comonomer(s) is methacrylic acid and/or acrylic acid and the non-acid functional, non-crosslinking comonomer(s) is selected from the group consisting of one or more of methyl methacrylate, styrene, ethylacrylate, n-butyl methacrylate, 2-ethylhexyl acrylate and n-butyl acrylate.

24. Process according to claim 21 wherein said oligomer is derived from a monomer system which comprises 3 to 12 weight % of methacrylic acid and/or acrylic acid, 1 to 10 weight % of diacetone acrylamide and/or acetoacetoxyethyl methacrylate, 10 to 30 weight % of methyl methacrylate, 30 to 70 weight % of n-butyl acrylate, 0 to 40 weight % of one or more of ethyl acrylate, 2-ethylhexyl acrylate and n-butyl methacrylate and 0 to 40 weight % of styrene.

25. Process according to claim 1 wherein the aqueous emulsion polymerisation of step b), is performed using an amount of emulsifying agent(s) newly added for that step (excluding the oligomer) which is less than 0.5 weight % based on the total weight of monomers charged for step b).

26. Process according to claim 1 wherein the only emulsifying agent(s) which may be present (excluding the oligomer itself) is that remaining from the emulsifying agent(s) used in the oligomer polymerisation of step a).

27. Process according to any claim 1 wherein the oligomer formed in step a) acts as an emulsifying agent in the polymerisation of step b).

28. Process according to claim 1 wherein the polymerisation processes in steps a) and b) are carried out in the same polymerisation vessel.

29. Process according to claim 1 wherein said hydrophobic polymer is derived from an olefinically unsaturated monomer system which includes a non-acid bearing, non-crosslinking monomer(s).

30. Process according to claim 29 wherein said non-acid, non-crosslinking monomer(s) is selected from the group consisting of one or more of acrylate and methacrylate esters of alkanols, styrenes, dienes, vinyl esters, nitriles, vinyl halides and vinylidene halides.

31. Process according to claim 30 wherein the acrylate and methacrylate esters are normal and branched alkyl esters of C1 to C12 alcohols and acrylic or methacrylic acid, the styrenes are styrene itself, α-methyl styrene, o-, m- and p-methylstyrene, o-, m- and p-ethyl styrene, p-chlorostyrene, and p-bromostyrene, the dienes are 1,3-butadiene and isoprene, the vinyl esters are vinyl acetate and vinyl alkanoates, the vinyl halide is vinyl chloride, and the vinylidene halide is vinylidene chloride.

32. Process according to claim 29 wherein the monomer system used in the preparation of the hydrophobic polymer includes a crosslinking comonomer(s) having a functional group(s) for providing crosslinkability selected from the group consisting of epoxy, hydroxy, ketone and aldehyde groups.

33. Process according to claim 32 wherein said crosslinking comonomer(s) is selected from the group consisting of one or more of glycidyl methacrylate and acrylate, hydroxyalkyl methacrylates and acrylates, the acetoacetoxy esters of hydroxyalkyl acrylates and methacrylates, and keto-containing amides.

34. Process according claim 29 wherein the monomer system used for the preparation of the hydrophobic polymer contains less than 5 weight % of any acid-functional comonomer.

35. Process according to claim 34 wherein the monomer system contains no acid-functional comonomer.

36. Process according to claim 1 wherein said hydrophobic polymer is made from a monomer system comprising at least one of C1–C10 alkyl methacrylates and C3–C10 alkyl acrylates, and diacetone acrylamide and/or acetoacetoxyethyl methacrylate.

37. Process according to claim 1 wherein said hydrophobic polymer has a number average molecular weight of at least 50,000.

38. Process according to claim 37 wherein the hydrophobic polymer has a number average molecular weight of at least 100,000.

39. Process according to claim 1 wherein the aqueous solution of the oligomer of step a) is admixed with all of the monomers to be used in the formation of the hydrophobic polymer and an otherwise conventional "all-in-one" batch polymerisation (with no further addition of monomer(s)) is carried out to make the hydrophobic polymer.

40. Process according to claim 1 wherein all of the oligomer solution of step a) is present in the polymerisation vessel used to make the hydrophobic polymer prior to the start of polymerisation together with some of the monomer system for the hydrophobic polymer, with the remainder of the monomer system for the hydrophobic polymer being added in one addition after the polymerisation has commenced.

41. Process according to claim 1 wherein all of the oligomer solution of step a) is present in the polymerisation vessel used to make the hydrophobic polymer prior to the start of the polymerisation, and the monomer system for the hydrophobic polymer is split into several equal parts (batches), these parts being added and polymerised consecutive to one another.

42. Process according to claim 1 wherein part (or none) of the monomer system for the hydrophobic polymer is present prior to the start of polymerisation in the polymerisation vessel used to make the hydrophobic polymer and part (or the entire amount) is fed to the reaction medium in the polymerisation vessel during the course of polymerisation.

43. Process according to claim 42 wherein the aqueous oligomer solution of step a) is present in part in the reaction medium for the polymerisation to make the hydrophobic polymer while part of the aqueous oligomer solution is mixed with the entire monomer system for the hydrophobic polymer and the latter fed to the reaction medium in the polymerisation vessel during the polymerisation.

44. Process according to claim 42 wherein the entire oligomer solution of step a) is present in the polymerisation vessel prior to the start of polymerisation and the entire monomer system for the hydrophobic polymer is fed to the vessel during the polymerisation, there being no oligomer present in the monomer feed.

45. Process according to claim 42 wherein all of the aqueous oligomer solution of step a) is present in the polymerisation vessel prior to the start of the polymerisation together with part of the monomer system for the hydrophobic polymer, and the remainder of the monomer system for the hydrophobic polymer fed during polymerisation, there being no oligomer in the feed.

46. Process according to claim 42 wherein part of the oligomer solution of step a) is present in the polymerisation vessel prior to start of the polymerisation to make the hydrophobic polymer together with part of the monomer system for the hydrophobic polymer, and the remainder of the monomer system for the hydrophobic polymer admixed with the remainder of the oligomer solution is fed during polymerisation.

47. Process according to claim 1 wherein the crosslinking agent is selected, depending on the crosslinking functionality in the oligomer and (if present) in the hydrophobic polymer, from the group consisting of a polyisocyanate, melamine, glycoluril, a polyamine, and a polyhydrazide.

48. Process according to claim 1 wherein the ratio of the number of crosslinker groups present in the oligomer and (if employed) in the hydrophobic polymer to the number of reactive groups (for crosslinking purposes) in the crosslinking agent is within the range of from $10/1$ to $1/3$.

49. Process according to claim 1 wherein the solids content of the resulting aqueous composition is within the range of from 20 to 65 wt % on a total weight basis.

50. Process according to claim 1 wherein the relative amounts of the oligomer and the hydrophobic polymer in the resulting aqueous composition is such that the wt % of the oligomer, based on the wt % of the oligomer plus the hydrophobic polymer, is within the range of from 1 to 70 wt %.

* * * * *